(12) United States Patent
Tanizawa

(10) Patent No.: US 6,407,746 B1
(45) Date of Patent: Jun. 18, 2002

(54) IMAGE PROCESSING METHOD FOR HIGH SPEED DISPLAY BASED ON ROTATION OF DIFFERENT KINDS OF DATA INCLUDING REDUCED DATA AND APPARATUS FOR THE SAME

(75) Inventor: Toshihiro Tanizawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/122,183

(22) Filed: Jul. 24, 1998

(30) Foreign Application Priority Data

Aug. 18, 1997 (JP) ............................................. 9-221481

(51) Int. Cl.[7] .......................... H04M 9/76; H04M 9/77; H04M 5/21
(52) U.S. Cl. .................... 345/649; 345/547; 345/549; 345/657; 348/599; 348/631; 348/663
(58) Field of Search ................................ 348/488, 489, 348/582, 583, 599, 630–631, 638–639, 642–645, 653–654, 663, 679, 2, 716–718, 390.1, 391.1, 393.1, 396.1; 345/649, 657, 689, 571–574, 543, 547, 549, 564–565, 567, 531, 537, 544; 386/295–297, 162, 166

(56) References Cited

U.S. PATENT DOCUMENTS

| | | | | |
|---|---|---|---|---|
| 4,394,774 A | * | 7/1983 | Widergren et al. | 382/250 |
| 5,019,906 A | * | 5/1991 | Wesolowski | 348/715 |
| 5,227,863 A | * | 7/1993 | Bilbrey et al. | 348/578 |
| 5,303,038 A | * | 4/1994 | Trber et al. | 348/708 |
| 5,809,200 A | * | 9/1998 | Nishimoto et al. | 386/46 |
| 5,970,203 A | * | 10/1999 | Nishimoto et al. | 386/46 |

FOREIGN PATENT DOCUMENTS

| | | | |
|---|---|---|---|
| JP | 57-191690 | 11/1982 | ............ G09G/3/20 |
| JP | 61-240382 | 10/1986 | ............ G06F/15/72 |
| JP | 62-244095 | 10/1987 | ............ G09G/1/16 |
| JP | 63-173177 | 7/1988 | ............ G06F/15/66 |
| JP | 1-94388 | 4/1989 | ............ G09G/1/00 |
| JP | 2-260030 | 10/1990 | ............ G06F/3/153 |
| JP | 3-63695 | 3/1991 | ............ G09G/5/36 |
| JP | 3-180984 | 8/1991 | ............ G06F/15/66 |
| JP | 4-254890 | 9/1992 | ............ G09G/5/36 |
| JP | 5-276422 | 10/1993 | ............ H04N/5/225 |
| JP | 7-298032 | 11/1995 | ............ H04N/1/387 |
| JP | 7-325753 | 12/1995 | ............ G06F/12/04 |
| JP | 8-3851 | 1/1996 | ............ G06T/11/60 |

* cited by examiner

*Primary Examiner*—Matthew Luu
*Assistant Examiner*—Wesner Sajous
(74) *Attorney, Agent, or Firm*—Sughrue Mion, PLLC

(57) ABSTRACT

An image processing apparatus includes a data dividing section for dividing digital data into a plurality of blocks of data. A first parallel shift control section controls, block by block, first parallel shift for shifting the blocks of digital data to positions coinciding with an angle of rotation of an image. A second parallel shift control section subdivides the digital data in each of the blocks into subblock data, and controls second shift for shifting the subblock data in each block to positions coinciding with the angle of rotation of the image such that a color image is correctly displayed. The apparatus is capable of rotating a color image correctly and rapidly with a simple circuit arrangement.

25 Claims, 11 Drawing Sheets

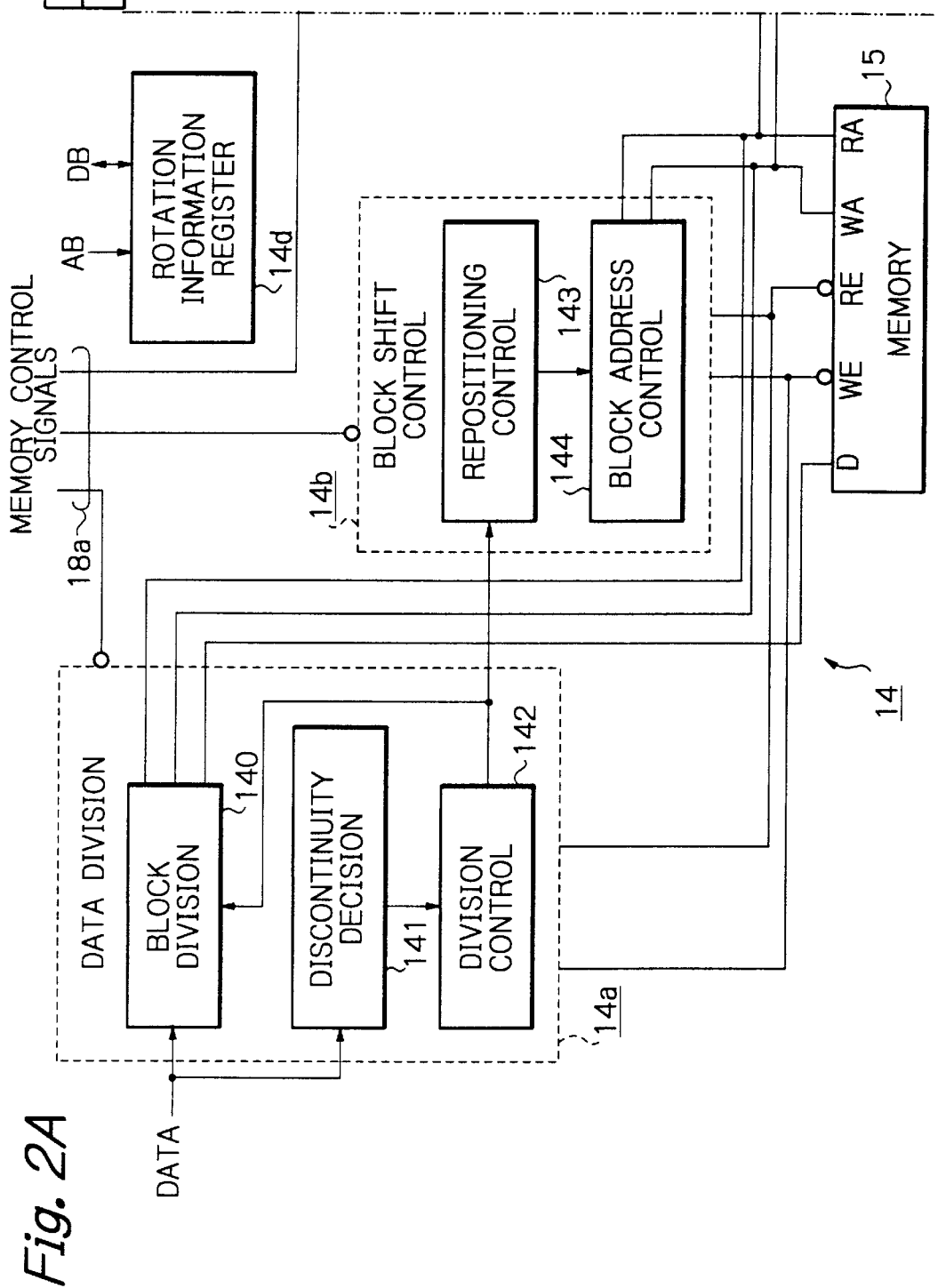

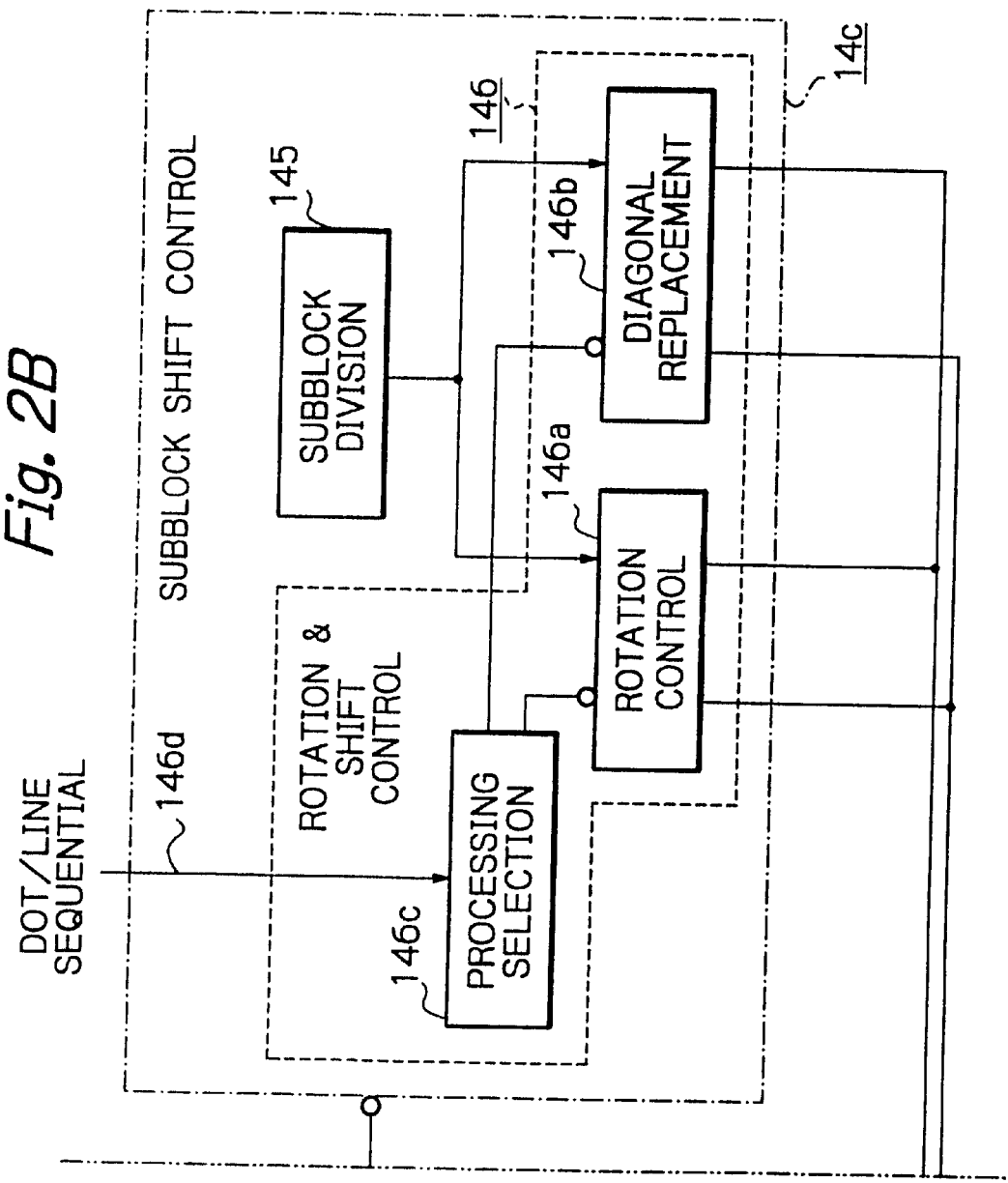

| Y(3,0) Cb(2,0) | Y(3,1) Cb(2,1) | Y(3,2) Cb(2,2) | Y(3,3) Cb(2,3) | $C_b$ |
| --- | --- | --- | --- | --- |
| Y(2,0) Cr(2,0) | Y(2,1) Cr(2,1) | Y(2,2) Cr(2,2) | Y(2,3) Cr(2,3) | $C_r$ |
| Y(1,0) Cb(0,0) | Y(1,1) Cb(0,1) | Y(1,2) Cb(0,2) | Y(1,3) Cb(0,3) | $C_b$ |
| Y(0,0) Cr(0,0) | Y(0,1) Cr(0,1) | Y(0,2) Cr(0,2) | Y(0,3) Cr(0,3) | $C_r$ |

SBA

| Y(3,0) Cr(2,1) | Y(3,1) Cb(2,1) | Y(3,2) Cr(2,3) | Y(3,3) Cb(2,3) |
| --- | --- | --- | --- |
| Y(2,0) Cr(2,0) | Y(2,1) Cb(2,0) | Y(2,2) Cr(2,2) | Y(2,3) Cb(2,2) |
| Y(1,0) Cr(0,1) | Y(1,1) Cb(0,1) | Y(1,2) Cr(0,3) | Y(1,3) Cb(0,3) |
| Y(0,0) Cr(0,0) | Y(0,1) Cb(0,0) | Y(0,2) Cr(0,2) | Y(0,3) Cb(0,2) |

SBA

IMAGE PROCESSING METHOD FOR HIGH SPEED DISPLAY BASED ON ROTATION OF DIFFERENT KINDS OF DATA INCLUDING REDUCED DATA AND APPARATUS FOR THE SAME

BACKGROUND OF THE INVENTION

1. Field of the Invention

The present invention relates to an image processing method for separating an input image signal into a luminance signal and a color signal, converting them to corresponding digital signals, time-division sampling luminance data and color data respectively represented by the digital signals to thereby decode the data, and rotating an image represented by the decoded data, and an apparatus for the same. The method and apparatus are particularly suitable for, e.g., the display or printing of a still image in a car navigation system or an electronic file system.

2. Description of the Background Art

Today, digital processing is predominant with image processing apparatuses over analog processing. A digital image processing apparatus digitizes an image signal, writes the resulting digital image data (pixels) in a memory, and then executes various kinds of signal processing with the image data in order to implement, e.g., required display. A rotation display function is one of various signal processing functions available today and extensively used for a broad range of applications based on some different schemes, as follows.

A first image rotating scheme uses an extra memory for display independent of a memory for storing image data, as taught in, e.g., Japanese patent publication No. 3851/1996 and Japanese patent laid-open publication Nos. 298032/1995, 254890/1992, 2600301/1990, and 173177/1988. When image data are written to the extra memory, the writing direction is varied in accordance with desired rotation.

A second image rotating scheme uses an SRAM (Static Random Access Memory) or similar high speed memory for the above extra memory independent of the image data memory, as disclosed in, e.g., Japanese patent laid-open publication Nos. 325753/1995, 180984/1991, 63695/1991, 94388/1989, 2440951/1987, and 240382/1986. For the rotation of an image, image data written to the high speed memory are read out in a particular direction.

A third image rotating scheme is such that image data rearranged to represent a rotated image are written to a memory beforehand and then displayed in a particular condition based on, e.g., whether or not the image should be rotated. This kind of scheme is proposed in Japanese patent laid-open publication No. 191690/1982 by way of example.

When a color image should be displayed after rotation, the above first to third image rotating schemes each writes input RGB (Red, Green and Blue) raw data in the addresses of a memory which will coincide with positions rotated in a designated direction, or reads data out of a memory, performs, calculation with the data and surrounding image data, and writes the resulting new image data matching with rotation in the memory. An image processing apparatus using any one of such conventional schemes assumes the rotation of RGB or three primary color data. However, the problem is that when luminance data and chrominance data are written to a memory point sequentially, as distinguished from line-sequentially, rotation processing is apt to prevent the data from being correctly displayed and practically fail, as will be described specifically later.

A fourth image rotating scheme which is a solution to the above problem is under study and rotates an image by using data other than the RGB data, as disclosed in Japanese patent laid-open patent publication No. 276422/1993. Briefly, the fourth scheme executes calculation with data input to and stored in an image processing apparatus and displays the result of calculation. A specific application of the fourth scheme is an image processing apparatus of the type writing the result of calculation in the same memory or another memory in, e.g., a faithful filter arrangement and then causing it to be displayed.

There is an increasing demand for an image processing apparatus allowing new functions to be added thereto without an increase in cost. To meet this demand, extended studies and researches are under way for, e.g., maintaining the minimum necessary memory capacity of an image processing apparatus while preserving the conventional basic construction and performance.

The state-of-the-art color image rotation schemes each rotates RGB raw data to positions coinciding with a rotated image and then write the rotated data in a memory, or reads stored data, performs. calculations with the data and surrounding image data (dots), and writes the resulting new image data matching with rotation in a memory, as stated previously. This, however, brings about a problem that when a DRAM (Dynamic RAM) is used as a temporary memory for temporarily storing the image data for the rotation of a color image, it increases the number of structural elements and therefore the cost. Likewise, an image processing apparatus based on the second image rotating scheme uses an expensive SRAM and is therefore expensive itself. The fourth image rotating scheme cannot complete image rotation in a time because it needs calculation. Consequently, an image forming apparatus with any one of the above conventional schemes cannot meet the demand stated earlier.

The signal subjected to Y/C separation may be subjected to 4:2:2 subsampling in order to meet the previously stated demand, as also proposed in the past. It has been reported that the 4:2:2 subsampling system does not deteriorate the quality of an image to be displayed because chrominance data are smaller in the amount of information to be transferred to a person than luminance data. By effectively using such a characteristic of chrominance data, it is possible to implement 4:2:2 subsampling with a memory capacity which is only two-thirds of the memory capacity necessary for, e.g., the RGB system or a 4:4:4 sampling system. In addition, an encoder for use in the image processing apparatus is simplified in circuit arrangement because it inverts and encodes every other chrominance data in response to a switching signal input thereto. The application of 4:2:2 subsampling system to an image processing apparatus is increasing because of the above advances.

However, assume that luminance data and chrominance data produced by the 4:2:2 subsampling system are stored in an image memory and simply rotated. Then, when chrominance data sequence is fed point-sequentially, a certain line has only chrominance data R-Y ($C_r$) while the next line has only chrominance data B-Y ($C_b$). If the data in such a relation are fed to an encoder having been used, a rotated image cannot be correctly displayed, as well known in the art. Thus, it is difficult to implement image rotation with a simple and efficient image processing apparatus.

SUMMARY OF THE INVENTION

It is therefore an object of the present invention to provide an image processing apparatus capable of rotating a color image correctly and rapidly with a simple circuit arrangement.

An image processing apparatus of the present invention is of the type including a Y (luminance)/C (color) separating section for separating an input color image signal into a luminance signal and a color signal, a digital converting section for sampling the luminance signal and color signal input from the Y/C separating section to thereby convert them to corresponding pixel-by-pixel digital data, a decoding section for time-division sampling the digital data input from the digital converting section and respectively representative of the luminance signal and color signal to thereby decode the digital data, a memory for storing the digital data decoded and output from the decoding section, and a memory control section for controlling writing and reading of the digital data out of the memory. A data dividing section divides the digital data into a plurality of blocks of digital data and causes the memory control section to write each of the blocks of digital data in one of a plurality of block areas defined in the memory area of the memory. A first parallel shift control section controls, block by block, first parallel shift for shifting the blocks of digital data to positions coinciding with the angle of rotation of an image. A second parallel shift control section subdivides each block of digital data into a plurality of subblocks of digital data, and controls a second shift for shifting the digital data of each subblock to positions coinciding with the above angle of rotation such that a color image is correctly displayed.

Also, an image processing method of the present invention includes the steps of separating an input color image signal into a luminance signal and a color signal, converting the luminance signal and color signal to corresponding pixel-by-pixel digital data, decoding the digital data by time-division sampling, storing each pair of luminance signal and color signal corresponding to a particular pixel in the memory area of a memory, and rotating an image fed from a memory control section for controlling the memory. In the event of image rotation, the digital data decoded are divided into a plurality of blocks of digital data. Each block of digital data is written to one of a plurality of block areas defined in the memory area. The blocks of digital data are shifted to positions coinciding with the angle of rotation of an image block by block. The digital data in each block area stored in the memory are subdivided into a plurality of subblocks of digital data. Each subblock of digital data in the respective block and respectively representative of the luminance signal and color signal are shifted to positions coinciding with the above angle of rotation such that a color image is correctly displayed, and then the positions are rearranged.

BRIEF DESCRIPTION OF THE DRAWINGS

The objects and features of the present invention will become more apparent from the consideration of the following detailed description taken in conjunction with the accompanying drawings in which:

FIG. 2 shows how to combine FIGS. 2A and 2B;

FIGS. 2A and 2B are schematic block diagrams showing, when combined as shown in FIG. 2, a specific configuration of a memory control section included in the illustrative embodiment;

DESCRIPTION OF THE PREFERRED EMBODIMENT

Figure 1:
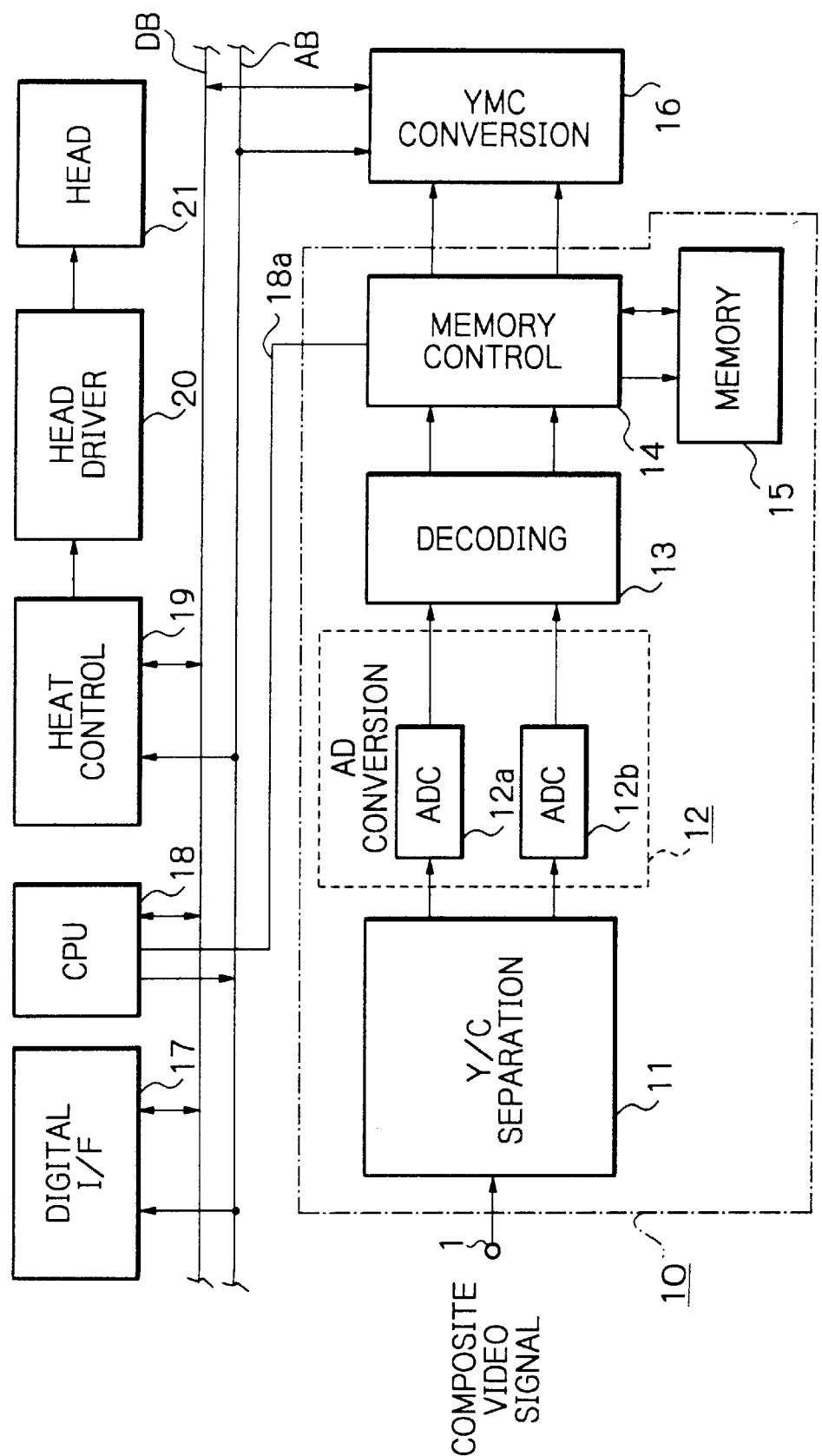
FIG. 1 is a block diagram schematically showing an image processing apparatus embodying the present invention.

Referring to FIG. 1 of the drawings, an image processing apparatus embodying the present invention and having a printing capability is shown and generally designated by the reference numeral 10. Briefly, the apparatus 10 separates an input image signal into a luminance signal and a color signal, digitizes them to produce corresponding digital signals, and executes decoding and rotation with the digital signals. For decoding, in particular, the apparatus 10 executes point-sequential, time-division processing with the color signal (chrominance signals). With point-sequential, time-division processing, it is possible to reduce the memory capacity to two-thirds, compared to, e.g., RGB processing or 4:4:4 sampling. This, coupled with the fact that image quality is free from deterioration, has accelerated the application of point-sequential, time-division processing. The apparatus 10 has an image rotation capability and may be used to display or print a still image in, e.g., a car navigation system or an electronic file system.

Figure 11:
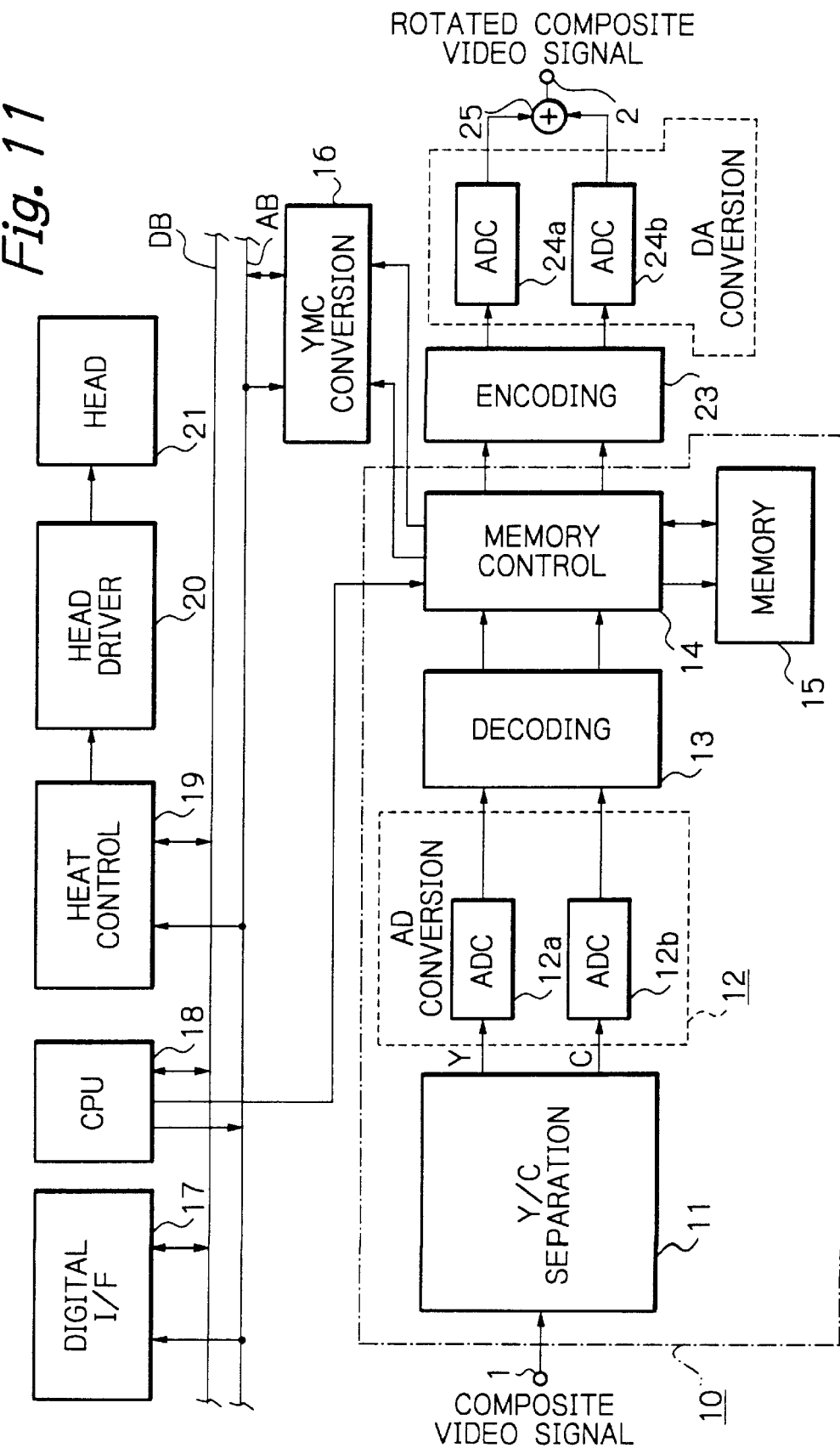
FIG. 11 is a schematic block diagram identical with FIG. 1 except for the addition of an arrangement for display.

As shown in FIG. 1, the apparatus 10 includes a Y/C separation 11, an analog-to-digital (AD) conversion 12, a decoding 13, a memory control 14, and a memory 15. As shown in FIG. 11, the memory control 14 is followed by an encoding 23, a digital-to-analog (DA) conversion 24, and an adder 25 which will be described later.

The Y/C separation 11 receives an image signal or composite video signal and separates it into a chrominance signal (Y) and a color signal (C) which are analog signals. The color signal C is a combination of chrominance signals R-Y and B-Y which will be respectively labeled $C_r$ and $C_b$ hereinafter.

The AD conversion 12 converts the luminance signal Y and color signal C to corresponding digital signals. Specifically, the AD conversion 12 has two analog-to-digital converters (ADCs) 12a and 12b respectively assigned to the luminance signal Y and color signal C. As a result, the chrominance signal Y and color signal C turn out digital data. These digital data, i.e., luminance data and color data can be dealt with as pixel data constituting an image.

The decoding 13 effects 4:2:2 subsampling with the luminance data and chrominance data output from the ADCs 12a and 12b by use of a time division scheme and a dot-sequential, time division scheme, respectively. As a result, the luminance data and color data turn out digital color image data in which the luminance signal Y and chrominance signals Cr and Cb are held in a preselected relation. The luminance data and chrominance data, e.g., digital color image data are written to the memory 15 under the control of the memory control 14 while being held in the above relation. If desired, the 4:2:2 subsampling system may be replaced with a 4:1:1 subsampling system for saving the capacity of the memory 15.

The memory 15 should preferably be implemented by a DRAM which is less expensive than an SRAM. The memory 15 is connected to the memory control 14 by a data line, a write/read address line, a write enable line, a read enable line and other signal lines, so that the data are written to the memory 15 in accordance with control signals fed from the control 14. The memory 15 has its memory area MA divided into a plurality of square block areas BA each having M×M (M being an even number) pixels. Further, each block area BA is subdivided into a plurality of subblock areas SBA each having four pixels to be dealt with as a basic shift unit at the time of rotation.

As shown in FIGS. 2A and 2B, the memory control 14 includes a data division 14a, a block shift control 14b, and a subblock shift control 14c. A CPU (Central Processing Unit) 18 (see FIG. 1) delivers memory control signals 18a to the data division 14a, block shift control 14b and subblock shift control 14c in order to enable them. The CPU 18 may be provided outside of or inside of the apparatus 10, as desired. The data division 14a is made up of a block division 140, a discontinuity decision 141, and a division control 142. The block division 140 basically divides the data received from the decoding 13 into blocks each having M×M pixels, as stated earlier. It may occur that the memory area MA of the memory 15 cannot be divided by the blocks without any residual. In such a case, should the data be simply read only out of the divided blocks, the image would be displayed discontinuously. The block division 140, discontinuity decision 141 and division control 142 are included in the data division 14a in order to solve this problem.

The discontinuity decision 141 determines, based on the first and last read addresses written to the memory area MA of the memory 15, whether or not the continuity of the image to be displayed will be maintained, as will be described in detail later. The division control 142 controls the division of the memory area MA into blocks in accordance with the result of decision output from the discontinuity decision 141.

The block shift control 14b controls, block by block, the parallel shift of the data (digital color image data) divided by the data division 14a (first parallel shift hereinafter). The first parallel shift refers to the shift of the data to positions corresponding to a desired angle of image rotation. In the block shift control 14b, a repositioning control 143 controls the read start position of each block area BA divided by the division control 142, particularly a change in the area-by-area read start position. A block address control 144 controls a data read address and a data write address block by block.

The subblock shift control 14c subdivides each block area or block area data BA divided by the data division 14a into subblock areas or subblock area data. In addition, the subblock shift control 14c controls the shift of the subblock data of each block area BA for displaying a color image correctly in accordance with an angle of image rotation and a rearrangement of the subblock data (second parallel shift hereinafter). Specifically, the control 14c causes the subblock data to be rotated in only one direction and causes a pair of diagonally opposite chrominance data included in the digital color image data to be replaced with each other.

More specifically, the subblock shift control 14c is made up of a subblock division 145 and a rotation and replacement control 146. The subblock division 145 subdivides each block area BA, which is a basic shift unit, into subblock areas SBA each having four pixels. The rotation and replacement control 146 controls the rotation of the data of each subblock area SBA to be effected by 90 degrees about the center of the area SBA, and controls the replacement of a pair of chrominance signals (chrominance data) $C_r$ and $C_b$ diagonally opposite to each other in the area SBA. Stated another way, the control 146 causes the digital data adjoining each other in the unit area SBA and representative of a luminance signal to be rotated in only one direction, causes a pair of digital data diagonally opposite to each other in the area SBA and representative of a color signal to be moved in parallel, and causes the other pair of diagonally opposite digital data representative of a color signal to be rotated in one direction. In this sense, the control 146 may be referred to as a color image shift control section.

For the above control, the rotation and replacement control 146 has a rotation control 146a, a diagonal replacement 146b, and a processing selection 146c. The rotation control 146a controls the rotation of the subblock data present in each subblock area SBA. The diagonal replacement 146b replaces only a pair of chrominance signals Cr and Cb diagonally opposite to each other in the subblock area SBA. The processing selection 146c is operative in response to a dot/line sequential signal 146d to select only the function of the rotation control 146a or a combination of the function of the rotation control 146a and that of the diagonal replacement 146b.

In the specific configuration shown in FIGS. 2A and 2B, the data division 14a, block shift control 14b and subblock shift control 14c are arranged independently of each other. Alternatively, the subblock shift control 14c may be included in the block shift control 14b, or the block shift control 14b may be included in the subblock shift control 14c.

With the above construction, the memory control 14 mainly controls the read address and write address of the memory 15. The memory control shifts the data of the memory 15 to the rotation position of an image by using addresses loaded either dot-sequentially or line-sequentially, as will be described in detail later. The memory control 14 should preferably include a rotation information register 14d for storing rotation information derived from the orientation of an image which is the rotated or processed version of an image represented by the data written to the memory 15. With the rotation information register 14d, the memory control 14 can control the memory 15 on the basis of the rotation information. So long as an image processing system using the image processing apparatus 10 is constructed, the rotation information register 14c may be implemented by a CPU collectively controlling the entire system including the memory control 14.

Figure 3:
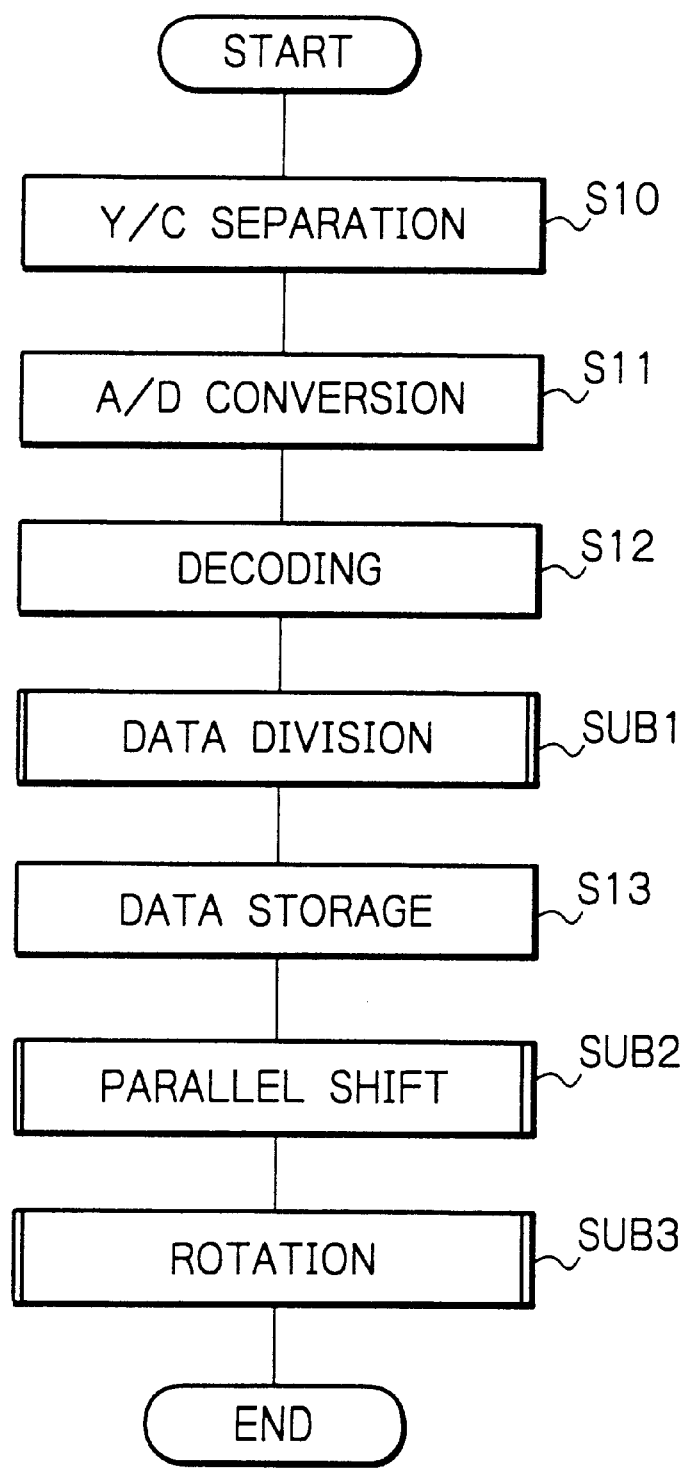
FIG. 3 is a flowchart demonstrating a main routine to be executed by the illustrative embodiment.

Reference to FIGS. 3–13, a specific operation of the image processing apparatus 10 will be described hereinafter. FIG. 3 shows a main routine beginning with the start of image rotation processing. As shown, an image signal (composite video signal) coming in through the input terminal 1 is separated into a luminance signal Y and a color signal C by the Y/C separation 11 (step S10). The luminance signal Y and color signal C each is converted to a corresponding digital data by the AD conversion 12 (step S11). Specifically, the analog signals input to the AD conversion 12 are sampled to turn out luminance data and color data corresponding to pixels.

Figures 4, 5:
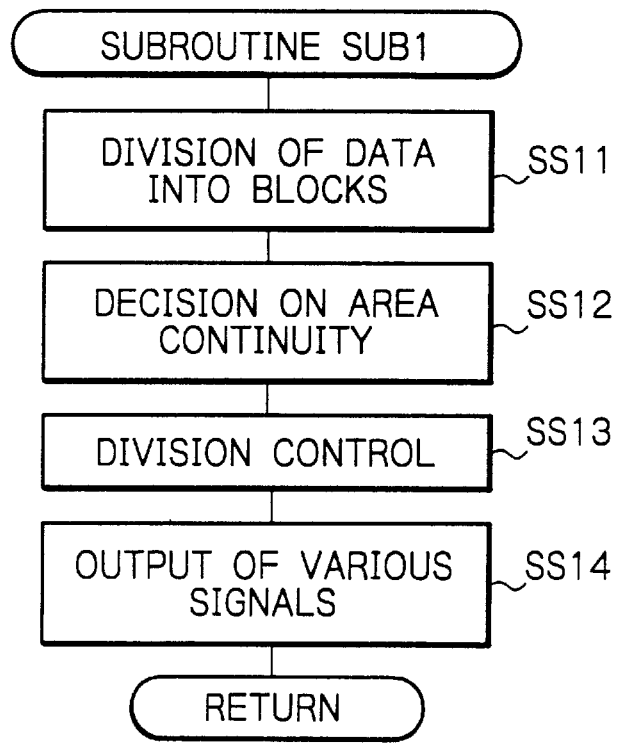
FIG. 4 shows a specific relation between luminance data and chrominance data written to a memory included in the illustrative embodiment, but not subjected to image rotation processing.
FIG. 5 is a flowchart showing a data division subroutine included in the flowchart of FIG. 3 in detail.

The luminance data and color data produced in the step S11 are subjected to 4:2:2 subsampling by the decoding 13 (step S12). That is, the chrominance data $C_r$ and $C_b$ are output alternately with each other in parallel with the luminance data. As a result, as shown in FIG. 4 specifically, digital color image data in which one luminance data and one chrominance data are paired pixel by pixel are written to the memory area MA.

The decoding step S12 is followed by a subroutine SUB1 in which the digital color image data are divided into blocks while maintaining the relationship between the paired luminance data and chrominance data. Specifically, the data division 14a is enabled by a memory control signal fed from the CPU 18, FIG. 1. The block division 140 delivers a write enable signal WE, write address data and divided data to the memory 15. After the subroutine SUB1, the divided blocks of data are written to the memory 15 under the control of the memory control 14 (step S13).

The step S13 is followed by a subroutine SUB2 for executing the previously mentioned first parallel shift for image rotation. The parallel shift refers to the shift of data in the memory area MA. In the subroutine SUB2, the data stored in the memory area MA, i.e., the digital color image data are shifted in parallel block by block. Specifically, the block shift control 14b is enabled by a memory control signal fed from the CPU 18. The block shift control 14b delivers a read enable signal RE and read address data to the memory 15 at the time of reading or delivers a write enable signal WE and write address data to the same at the time of writing, thereby causing the block-by-block data to be shifted in the memory area MA. Such a shift is repeated until the divided block data have been brought to block positions coinciding with a rotated image.

After the above first parallel shift, the second parallel shift also mentioned earlier is executed for the rotation of the image (subroutine SUB 3). At this instant, the subblock shift control 14c is enabled by a memory control signal fed from the CPU 18. The subblock shift control 14c, like the block shift control 14b, delivers a read enable signal RE and read address data to the memory 15 at the time of reading or delivers a write enable signal WE and write address data to the same at the time of writing, thereby causing the data of the individual subblock area SBA to be shifted. In practice, after subblock division preceding the shift for rotation has been executed, rearrangement and other processing are executed with the data of each subblock area SBA (digital color image data), as will be described more specifically later. By such a procedure, the data in the memory area MA are rearranged; that is, the point-sequential block data written to the memory 15 are roughly shifted to positions coinciding with a rotated image block by block, and then the data of each block are shifted to positions coinciding with the rotated image subblock by subblock. This allows the rotation of a color image represented by the input composite image signal to be correctly displayed.

The subroutines SUB2 and SUB3 shown in FIG. 3 may be suitably combined, if desired. For example, after the division of the digital color image data into blocks (subroutine SUB1), the surboutine SUB2 may be executed while including the subroutine SUB3 therein, although not shown specifically. In such a specific combination, after the block-by-block data have been shifted to positions coinciding with a rotated image, each block is immediately subdivided into subblocks, and then each subblock is rotated. That is, every time a single block is brought to a position coincident with a rotated image, its data are subjected to image rotation processing. Further, for more efficient image rotation processing, the subroutines SUB2 and SUB3 may be combined in consideration of, e.g., the temporary shift of the blocks and the shift of the blocks to their target positions coinciding with a rotated image.

The subroutines SUB1, SUB2 and SUB3 shown in FIG. 3 will be described more specifically hereinafter. The subroutine SUB1 is executed, after the main routine, when the memory control signal is fed from the CPU 18 to the data division 14a. As shown in FIG. 5, the subroutine SUB1 begins with a substep SS11 for dividing the data or digital color image data fed from the decoding 13 into blocks. Each block should preferably have a square area having an even number (M) of pixels at each side in order to obviate fractions in the memory. For example, assuming that the memory 15 has a conventional memory area having 1,024× 512 pixels, one side of each block area BA should preferably have 256 pixels. The division of the data is executed by the block division 140.

Figure 6:
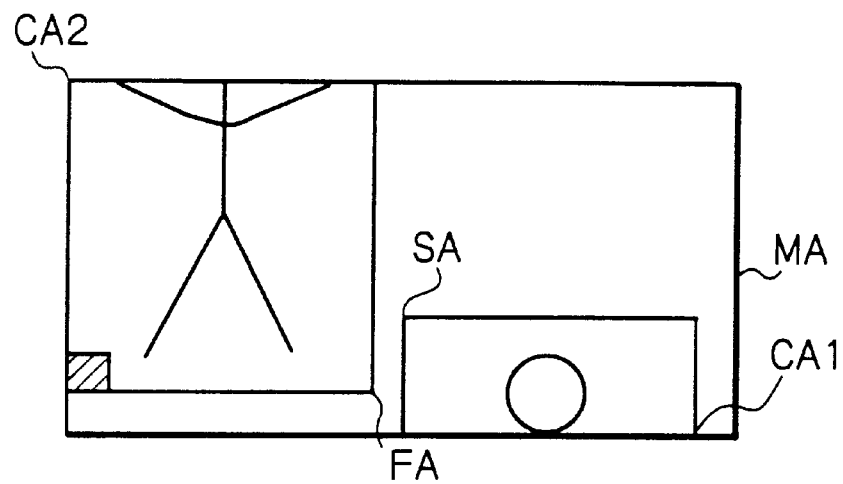
FIG. 6 shows the memory area of the memory occupied by specific data.

Assume that the data are divided in a specific condition shown in FIG. 6. In FIG. 6, a hatched square is representative of one of the block areas BA; the memory area MA shown in FIG. 4 is representative of a part of the block area BA. After the substep SS12 shown in FIG. 5, it is determined whether or not an image that has undergone the parallel shift will be displayed with continuity despite the data division shown in FIG. 6. This decision is done by the discontinuity decision 141 on the basis of the first position SA and last position FA (see FIG. 6) where the data are written to the memory area MA. More specifically, should the data written to the memory area MA of FIG. 4 be simply displayed, the resulting image would appear in two separate parts. In light of this, in the step SS12, whether or not a correct image will be displayed is determined on the basis of a relation between the total amount of data written to the memory 15 and the memory arrangement and write start address.

After the substep SS12, addresses are controlled by the division control 142 in such a manner as to maintain the continuity of the data in the memory area MA. For example, as shown in FIG. 6, assume that the data are sequentially written to the memory area MA from an address SA to an address CA1 located at the end of the memory boundary and then continuously written to an address CA2 and successive addresses. Then, the data division control 142 divides the data such that they can be dealt with as continuous data. Particularly, when the data adjoining the memory boundary should be dealt with as data belonging to the same block, the data division control 142 must pay attention to the discontinuous address data CA1 and CA2 in the memory area MA. The discontinuous address data are fed to the block division 140 and repositioning control 143.

In a substep SS14, the data division 14a and block division 140 respectively feed a write enable signal WE and write address data and data to the memory 15 while paying attention to the address data fed from the data division control 142. Thereafter, the program returns to the main routine. The data division 14a continuously sends various kinds of signals to the memory 15 until the end of data writing.

Figure 7:
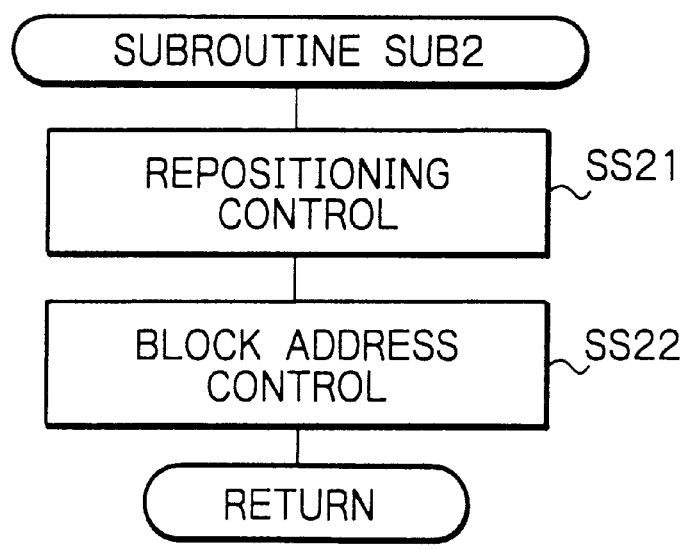
FIG. 7 is a flow chart showing a parallel shift subroutine also included in the flowchart of FIG. 3 in detail.

The subroutine SUB2 will be described with reference to FIG. 7 hereinafter. The subroutine SUB2 begins when a memory control signal is fed from the CPU 18 to the block shift control 14b. As shown, the repositioning control 143 causes the block address control 144 to control the address data such that the data stored at the boundary of the memory area MA and determined to belong to the same block are accurately read out. The repositioning control 143 stores data received from the division control 142 as address data needing attention.

Figure 8A:
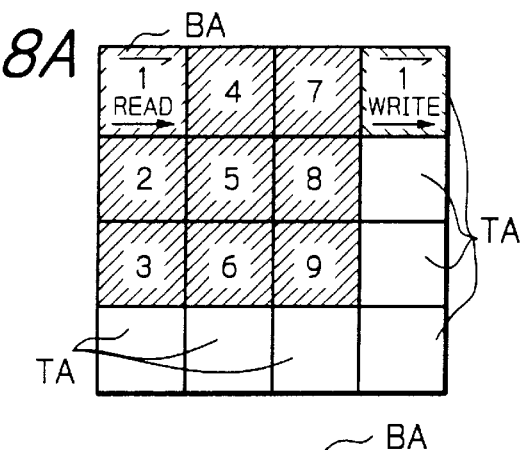
FIGS. 8A–8G demonstrates block-by-block data shift executed in the subroutine of FIG. 7.
Figure 8B:
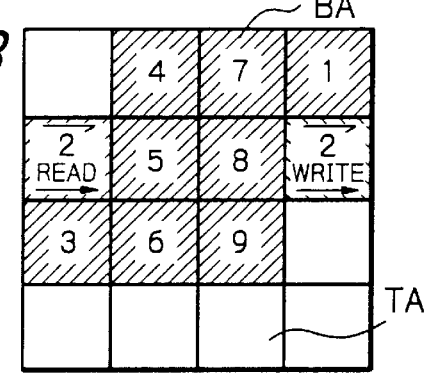
Figure 8C:
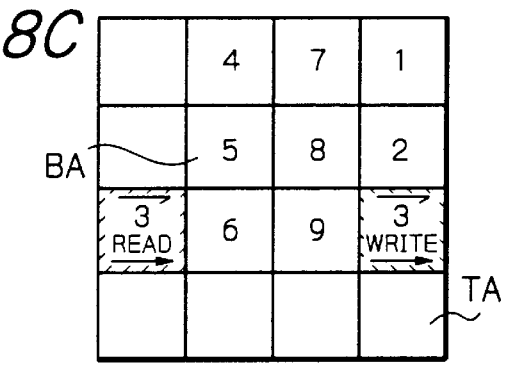
Figure 8D:
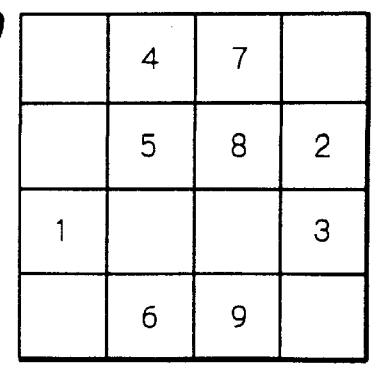
Figure 8E:
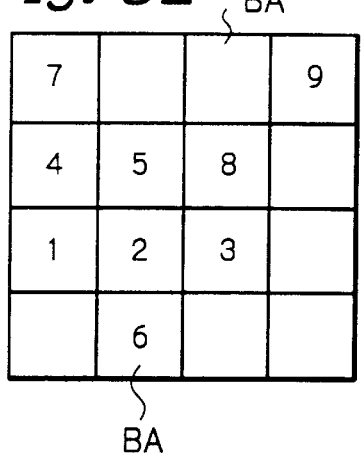
Figure 8F:
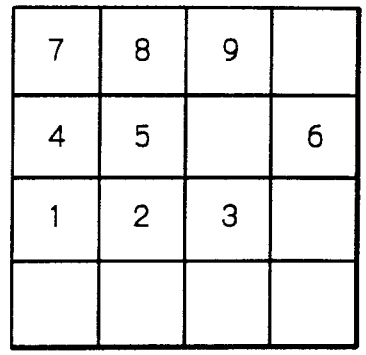
Figure 8G:
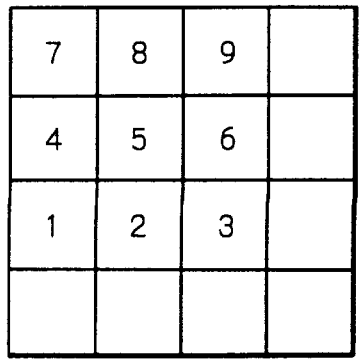

In a substep SS22, the block data divided by the block address control 144 are read out at a time and then written to the positions for block addresses of the block area BA selected in consideration of a rotation angle. During such a sequence of steps, the block shift control 14b feeds the read enable signal RE and read addresses RA to the memory 15 in order to control data reading, and then feeds the write enable signal WE and write addresses WA to the memory 15 in order to control data writing. As shown in FIG. 8A, assume that nine blocks of data are stored in the memory 15 by way of example. Two different ways of advancing the address of the memory 15 are available with the block shift control 14b. A first way is to increment the address by 256 in the horizontal direction (H) of the block and then increment it by two in the vertical direction (V). A second way is to increment the address by 256 in the direction V, and then increment it by two in the direction H. For this purpose, the block shift control 14b includes at least a horizontal read/write address counter, a vertical read/write address counter and an address enable control counter and generates various control signals for address control.

Assume a block #1 positioned at the top left of the memory 15 shown in FIG. 8A and indicated by an rightward upward hatching. The data of the block #1 are read out and then written to the top right region of the memory 15 indicated by a leftward upward hatching by the first way of advancing the address. Blocks #2 and #3 are shifted in exactly the same manner as the block #1, as respectively shown in FIGS. 8B and 8C. As the block shift control 14b repeats such control, the blocks #1–#3 as well as other the blocks #4–#9 are respectively shifted to empty block areas BA shown in FIGS. 8D–8F. Consequently, the blocks #1–#9 of FIG. 8A are respectively shifted to positions shown in FIG. 8G, i.e., rotated counterclockwise by 90 degrees. At this stage, the data of each block area BA have not been rotated yet.

As shown in FIGS. 8A–8G, the memory area MA of the memory 15 may include temporary areas TA in a part of its periphery portion. The temporary areas TA are used to temporarily store the data for promoting smooth and efficient shift of the data. In fact, when image data are stored in the memory 15, the area of the image data is smaller than the memory area without exception. For example, while the memory area is 1,024×512 in the case of the NTSC (National Television System Committee) standard or 1,024× 1,024 in the case of the PAL (Phase Alternate Line) standard, the image data area is 768×480 in the case of the NTSC standard or 720×570 in the case of the PAL standard.

When all the blocks of data are shifted under the above address control (subroutine SUB2), the program returns to the main routine. At this instant, the memory control signal fed to the block shift control 14b is brought to its OFF state.

Figure 9:
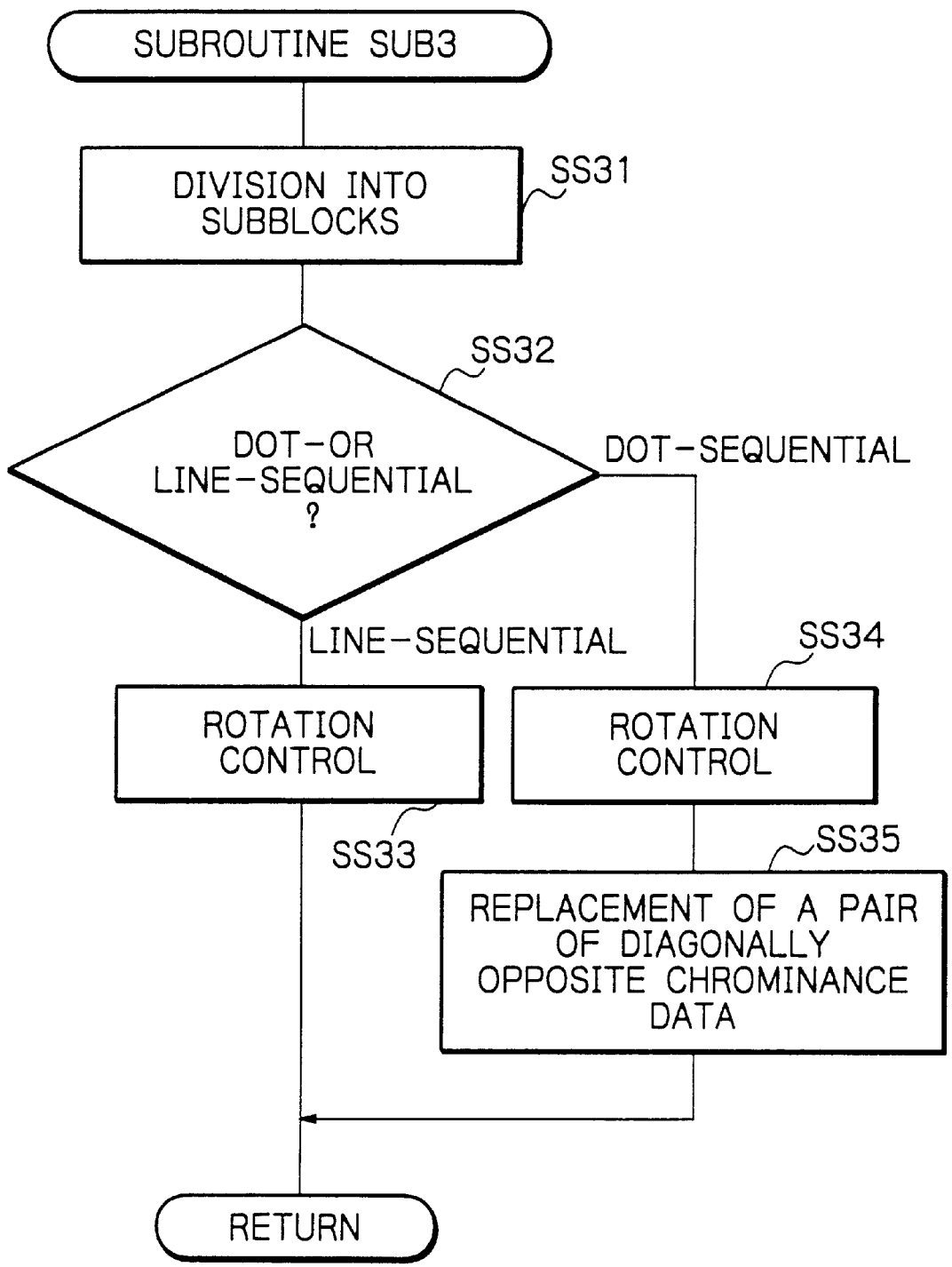
FIG. 9 is a flowchart showing a rotation shift subroutine also included in the flowchart of FIG. 3 in detail.

The subroutine SUB3 will be described in detail with reference to FIG. 9. The subroutine SUB3 begins when a memory control signal is applied from the CPU 18 to the subblock shift control 14c. As shown, the data present in each block area BA stored in the subroutine SUB1 are subdivided into subblocks of data (substep SS31). A single subblock corresponds to the basic shift unit mentioned earlier, and each subblock area SBA has four pixels. Should each subblock area SBA have more than four pixels, the distance between the pixels would be excessively great at the end portions of the block and would complicate rotation processing. A substep SS32 and successive substeps to be described hereinafter implement data repositioning in the individual subblock.

After the substep SS31, whether subblock shift processing should be executed alone or in combination with repositioning is determined (substep SS32). This decision is made in order to correctly display a rotated image in accordance with a dot-sequential mode or a line-sequential mode selected, as will be described specifically later. The processing selection 146c, FIG. 1, determines whether a mode selection signal fed thereto is indicative of a dot-sequential mode or a line-sequential mode. In the line-sequential mode (LINE-SEQUENTIAL, substep SS32), the selection 146c returns via a substep SS33. In the dot-sequential mode (DOT-SEQUENTIAL, substep SS32), the selection 146c returns via substeps SS34 and SS35. The selection 146c feeds an enable signal to each of the rotation control 146a and diagonal replacement 146b.

In the substep SS33, in response to the enable signal fed from the processing selection 146c, the rotation control 146a rotates the adjoining subblock data of each subblock area for basic shift unit SBA in one direction by the same angle as in the subroutine SUB2. In this manner, the rotation and replacement control 146 controls the parallel shift of the data on a subblock basis.

Let the four pixels of a certain subblock area SBA be represented by positions $[X_{2n}, Y_{2n}]$, $[X_{2n+1}, Y_{2n}]$, $[X_{2n}, Y_{2n+1}]$ and $[X_{2n+1}, Y_{2n+1}]$ (n being an integer). Assume that these four pixels are arranged as shown below:

$[X_{2n}, Y_{2n}] [X_{2n+1}, Y_{2n}]$ $[X_{2n+1}, Y_{2n}] [X_{2n+1}, Y_{2n+1}]$

Then, the rotation and replacement control 146 causes its rotation control 146a to rotate the above four pixels counterclockwise by 90 degrees. As a result, the data of the pixel $[X_{2n}, Y_{2n}]$ is shifted to the position of the pixel $[X_{2n}, Y_{2n+1}]$ is the data of the pixel $[X_{2n}, Y_{2n+1}]$ is shifted to the position of the pixel $[X_{2n+1}, Y_{2n+1}]$, the data of the pixel $[X_{2n+1}, Y_{2n+1}]$ is shifted to the position of the pixel $[Y_{2n+1}, Y_{2n}]$, and the data of the pixel $[X_{2n+1}, Y_{2n}]$ is shifted to the position of the pixel $[X_{2n}, Y_{2n}]$, as shown below:

$[X_{2n+1}, Y_{2n}] [X_{2n+1}, Y_{2n+1}]$ $[X_{2n}, Y_{2n}] [X_{2n}, Y_{2n+1}]$

Figures 10A, 10B:
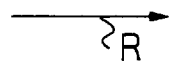
FIGS. 10A and 10B respectively demonstrate a relation between luminance data and chrominance data undergone rotation only and a relation between the same undergone rotation and the replacement of only a pair of diagonally opposite chrominance data in the subroutine of FIG. 9.

When the above rotation procedure is executed with all of the subblocks SBA, the arrangement of the memory area MA shown in FIG. 4 by way of example is replaced with an arrangement shown in FIG. 10A. The data shown in FIG. 10A are read out in a direction indicated by an arrow R. As shown in FIG. 10A, the chrominance data $C_r$ and $C_b$ appear on consecutive lines alternately. So long as the chrominance data $C_r$ and $C_b$ are output line-sequentially, as shown in FIG. 10A, a rotated image can be correctly displayed. This, however, cannot be done when it comes to a dot-sequential data arrangement.

In the dot-sequential mode, as determined in the substep SS32, processing identical with the processing of the substep SS33 is executed such that the image represented by the dot-sequential arrangement of chrominance data is correctly displayed (substep SS34). By the substep SS34, the subblock data of each subblock SBA are rotated.

After the substep SS34, in response to an enable signal from the processing selection 146c, the subblock data of the luminance data and chrominance data $C_r$ and $C_b$ in each block are shifted to positions implementing a preselected rotation. Specifically, assuming the four pixels stated earlier, only the chrominance data of $[X_{2n+1}, Y_{2n}]$ and $[X_{2n}, Y_{2n+1}]$ diagonally opposite to each other are replaced with each other, but the data of $[X_{2n}, Y_{2n}]$ and $[X_{2n+1}, Y_{2n+1}]$ diagonally opposite to each other are left as they are.

In a sense, the above repositioning consists of a data rotating step, a chrominance data parallel shifting step, and a processing selecting step. This is because repositioning shifts the data of each subblock by rotating, in one direction, the digital luminance data and chrominance data adjoining each other in the subblock area SBA, shifts in parallel only a pair of chrominance data diagonally opposite to each other in each subblock area SBA, and determines, before the rotation of data and the parallel shift of chrominance data, whether the data rotation should be effected alone or in combination with the parallel shift of chrominance data.

Specifically, assume that the block area BA shown in FIG. 4 is subdivided into subblocks, and that attention is paid to four digital color image data arranged as shown below:

[Y(0,0), $C_r$(0,0)] [Y(1,0), $C_b$(0,0)]
[Y(0,1), $C_r$(0,1)] [Y(1,1), $C_b$(0,1)]

Then, the above image data are rotated to the following positions by the subroutine SUB2 (see FIG. 10A):

[Y(1,0), $C_b$(0,0)] [Y(1,1), $C_b$(0,1)]
[Y(0,0), $C_r$(0,0)] [Y(0,1), $C_r$(0,1)]

As a result, the digital data in the form of the pairs of luminance signals and chrominance signals are rotated in one direction, i.e., counterclockwise by 90 degrees.

Subsequently, to obviate the drawback particular to the dot-sequential data arrangement, the chrominance data $C_b$(0, 0) and $C_r$(0,1) are replaced with each other. Stated another way, only a pair of chrominance data diagonally opposite to each other are shifted in parallel to each other. Consequently, the digital data representative of the luminance signal are rotated in one direction for image rotation while only a part of the digital data representative of the chrominance signal is shifted in parallel, as shown below:

[Y(1,0), $C_r$(0,1)] [Y(1,1), $C_b$(0,1)]
[Y(0,0), $C_r$(0,0)] [Y(0,1), $C_b$(0,0)]

As the above procedure is repeated with the previously mentioned suffix n being sequentially varied, the rotation of the data in the subblock SBA completes. The data in the other subblocks are rotated in exactly the same manner as the data in the subblock SBA. This is the end of the subroutine SUB3.

By the above rotation processing, the memory area MA shown in FIG. 4 specifically is repositioned as shown in FIG. 10B. The data shown in FIG. 10B are sequentially read in the direction indicated by the arrow R. While the subblock shift processing and repositioning processing included in the subroutine SUB3 are executed in combination, the order in which they are executed is open to choice.

The digital color image data stored in the memory 15 and rotated by the above procedure are read out of the memory 15 under the control of the memory control 14. The rotated data representative of a correct color image are fed from the memory 15 to the YMC conversion 16, FIG. 1, although an output line from the memory 15 is not shown. In this manner, the apparatus 10 executes a sequence of image rotating steps with a simple circuit arrangement and simple address control. In addition, because the apparatus 10 involves no calculations, it can complete image rotation in about 0.2 to 0.3 second which is far shorter than the conventional image rotating time.

Referring again to FIG. 1, the YMC conversion 16 transforms the additive mixture type data output from the memory 15 to subtractive mixture type data applicable to a printer. The data output from the YMC conversion 16 are delivered to a heat control 19 via an address bus AB and a data bus DB. The apparatus 10 additionally includes a digital interface (I/F) 17, the CPU 18, a head driver 20, and a head 21 for printing out the above data on a paper or similar recording medium.

The heat control 19 further transforms the input data to data suitable for the head driver 20 and head 21. The head driver 20 feeds a drive signal to the head 21 in accordance with the data output from the heat control 19. The head 21 prints out the data on a recording medium by, e.g., supplying ink in accordance with the drive signal.

The illustrative embodiment rotates an input image and prints it on a paper or similar recording medium, as stated above. The embodiment may additionally include an arrangement for generating signals which cause the rotated image to be displayed on a display, as will be described with reference to FIG. 11 hereinafter. As shown, the encoding 23, DA conversion 24 and adder 25 mentioned previously are additionally included in the construction shown in FIG. 1.

Figure 12:
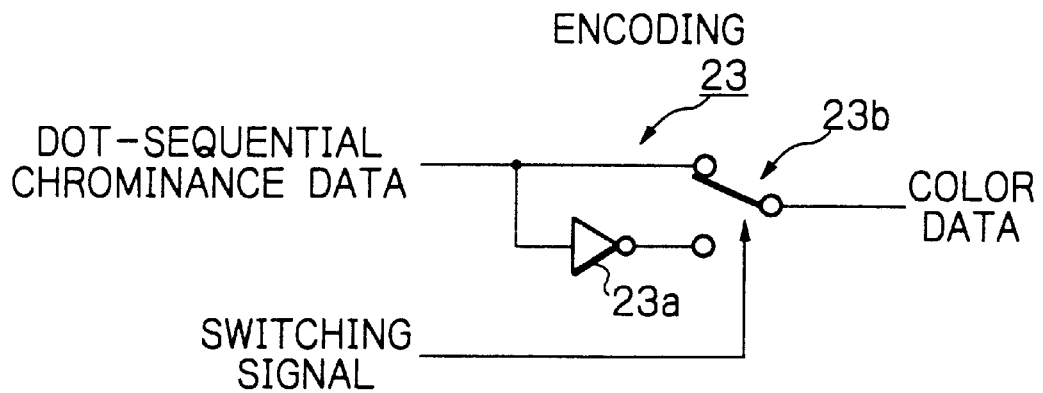
FIG. 12 is a circuit diagram showing a specific configuration of an encoding section shown in FIG. 11.

The encoding 23 follows the memory control 14 and executes encoding corresponding to the operation of the decoding 13, FIG. 1. As shown in FIG. 12 specifically, the encoding 23 has an inverter 23a and a switch 23b. The inverter 23a inverts the signs of the dot-sequential chrominance data read out of the memory 15. The switch 23b selects either the output of the inverter 23a or the dot-sequential chrominance data. A switching signal is fed to the switch 23b in order to cause it to switch the dot-sequential chrominance data every other point. The switch 23b is switched at a particular timing for each of the dot-sequential mode and line-sequential mode. The dot-sequential chrominance data selected by the switch 23b are input to the DA conversion 23 as color data (encoding). For a specific sequence of luminance data " . . . , Y0, Y1, Y2, Y3, Y4, Y5, . . . ", there are two different formats of chrominance data, i.e., " . . . $C_r$0, $C_b$0, $-C_r$2, $-C_b$2, $C_r$4, $C_b$4, . . . (format (1) hereinafter)" and " . . . , $-C_r$0, $C_b$0, $C_r$2, $-C_b$2, $-C_r$4, $C_b$4, . . . (format (2) hereinafter)". The encoding 23 outputs only the format (1) for the rotation and display of dot-sequential data or outputs the formats (1) and (2) while switching them line by line for the rotation and display of line-sequential data. It has been customary to connect a frame memory for storage between the encoding 23 and the DA conversion 24 for storing encoded data. The illustrative embodiment with the above construction eliminates the need for the frame memory and thereby reduces the number of parts, compared to conventional image processing apparatuses.

Figure 13A:
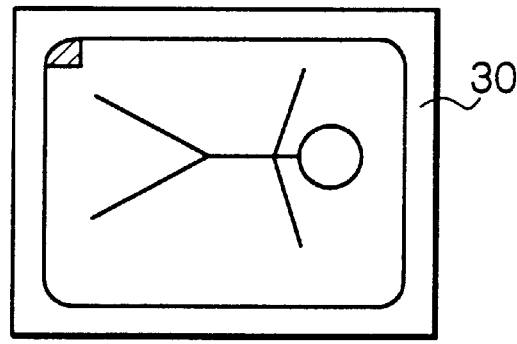
FIGS. 13A and 13B respectively show a specific image displayed without rotation and a rotated version of the same image.
Figure 13B:
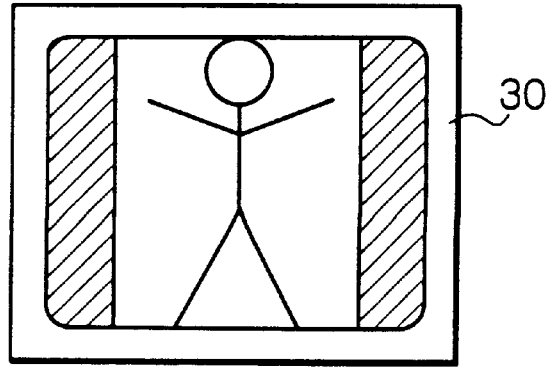

The DA conversion 24 converts the digital data output from the encoding 23 to analog data and has two digital-to-analog converters (DACs) 24a and 24b. The DACs 24a and 24b respectively output an analog luminance signal Y and an analog color signal C and feed them to the adder 25. The adder 25 mixes the luminance signal Y and color signal C and delivers the resulting composite video signal to a display 30 (see FIGS. 13A and 13B) via an output terminal 2. FIG. 13A shows a specific image appearing on the display 30 before rotation. When the composite video signal output from the adder 25 is applied to the display 30, a 90 degrees rotated version of the image of FIG. 13A appears on the display 30, as shown in FIG. 13B. This allows a person to see the image before printing it on a paper. Further, the apparatus 10 may be constructed such that an image appears in a particular orientation on each of the display 30 and paper. For example, when an image to be printed is accompanied by characters, the apparatus 10 may rotate the image in a manner different from the rotation for display in accordance with whether the characters are written vertically or horizontally. This will render the image easier to see in relation to the arrangement of the characters.

In the illustrative embodiment, control relating to the dot-sequential mode is assigned to the memory control 14 in order to correctly display a rotated image represented by the dot-sequential chrominance data. Alternatively, use may be made of two different kinds of encoders, one for dealing with a usual non-rotated image and the other for dealing with a rotated image. In this case, the encoder for a rotated image will be provided with the same function as the diagonal replacement 146b. With the two encoders, it is possible to cause the apparatus 10 to operate efficiently with common circuits being shared, while adapting itself to the difference between the dot-sequential mode and the line-sequential mode. Moreover, as for image processing, a particular encoding step may be selected for each of the dot-sequential mode and line-sequential mode, i.e., a first encoding step for encoding the output derived from the subblock shift or a second encoding step corresponding to the replacement of data.

The memory control 14, FIGS. 2A and 2B, preferably included in the apparatus 10 stores rotation information derived from the orientation of an image which is the rotated or processed version of an image represented by the data written to the memory 15, as stated earlier. In the event of image rotation, the apparatus 10 may rotate the subblock data first and then shift the block data block by block on the basis of the current angle of the image stored in the register 14d. The apparatus 10 can therefore rotate an image by each 90 degrees between 0 degree, 90 degrees, 180 degrees, and 270 degrees. Further, if a method of decrementing the read address is used, and if an image is rotated by a difference between 0 degree (return on the original position) or 90 degrees (rotate) and required rotation information, then positions equivalent to those implemented by the rotation of 0 degree, 90 degrees, 180 degrees and 270 degrees can be efficiently displayed.

The above configuration solves the problem that when an image with digital data representative of a color signal is subjected to dot-sequential, time-division subsampling and then rotated, color signals belonging to the same component occur on the same line. That is, image rotation can be correctly displayed despite the dot-sequential, time-division subsampling scheme. This successfully reduces the required memory capacity and therefore the cost of the apparatus 10 while promoting rapid image rotation with simple circuitry.

The 4:2:2 subsampling system applied to the color signal further saves the memory capacity. Because the subroutines SUB2 and SUB3 stated earlier can be executed in any desired order, the image rotation procedure is provided with unprecedented flexibility. In addition, rapid image rotation is achievable because the data are shifted without any calculation.

While the illustrative embodiment is assumed to receive a composite video signal, decoded digital data may be directly fed from a memory card or similar storage to the memory control 14. This also insures rapid image rotation.

The entire disclosure of Japanese Patent application No. 221481/1997 filed Aug. 18, 1997 including the specification, claims, accompanying drawings and abstract of the disclosure is in corporated therein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. An image processing apparatus including a Y/C separating section for separating an input color image signal into a luminance signal (Y) and a color signal (C), a digital converting section for sampling said luminance signal and said color signal input from said Y/C separating section to thereby convert said luminance signal and said color signal to corresponding pixel-by-pixel digital data, a decoding section for time-division sampling said digital data input from said digital converting section and respectively representative of said luminance signal and said color signal to thereby decode said digital data, a memory having a memory area defining a plurality of block areas for storing said digital data decoded and output from said decoding section, and a memory control section for controlling said memory to write and read out the digital data in and from said memory, said image processing apparatus comprising:

a data dividing section for dividing the digital data into a plurality of blocks of digital data and causing the memory control section to write each of said plurality of blocks of digital data in one of the plurality of block areas of the memory;

a first parallel shift control section for controlling, block by block, a first parallel shift for shifting said plurality of blocks of digital data to positions coinciding with an angle of rotation of an image; and a second parallel shift control section for subdividing each of said plurality of blocks of digital data into a plurality of subblocks of digital data, and controlling a second shift for shifting the digital data of each of said plurality of subblocks to positions coinciding with the angle of rotation of the image such that a color image is correctly displayed.

2. The apparatus in accordance with in claim 1, wherein said second shift control section is set after said first shift control section.

3. An apparatus in accordance with claim 1, wherein said plurality of blocks each comprises a square block area having an even number of pixels at each side.

4. An apparatus in accordance with claim 1, wherein said second parallel shift control section comprises:

a subblock dividing section for subdividing the digital data in each of said plurality of blocks into a plurality of subblocks each having four pixels as a basic shift unit; and a rotation and replacement control section for rotating adjoining subblock data of each of said plurality of subblocks in only one direction to thereby control the parallel shift of said subblock data, and replacing only a pair of digital data diagonally opposite to each other in a respective subblock area and representative of the color signal.

5. An apparatus in accordance with claim 1, wherein said data dividing section comprises:

a deciding section for determining, based on a first position and a last position of the memory area where the digital data are written, whether or not an image to be displayed by said first parallel shift will maintain continuity; and a data division control section for controlling data division in accordance with a result of decision of said deciding section when the memory area is to be divided into said plurality of blocks, said first parallel shift control section comprising a read control section for controlling a read start position of each of said plurality of blocks.

6. An apparatus in accordance with claim 1, wherein said memory control section comprises an information holding section for holding rotation information derived from an orientation of a rotated image of an image represented by the digital data stored in the memory, and controls the memory on the basis of said rotation information.

7. An apparatus in accordance with claim 1, further comprising:
an encoding section for executing encoding corresponding to an operation of said decoding section;
an analog converting section for converting signals output from said encoding section to analog signals; and
a mixing section for mixing the analog signals output from said analog converting section to thereby output a composite video signal.

8. An apparatus in accordance with claim 2, wherein said second parallel shift control section comprises:
a subblock dividing section for subdividing the digital data into said plurality of subblocks each having four pixels as a basic shift unit; and
an image shift control section for rotating adjoining subblock data of each of said plurality of subblocks in only one direction to thereby control the parallel shift of said subblock data, and shifting only a pair of digital data diagonally opposite to each other in a respective subblock area and representative of the color signal in parallel, while rotating the other pair of digital data representative of the color signal in one direction.

9. An apparatus in accordance with claim 4, wherein said rotation and replacement control section comprises:
a rotation control section for controlling rotation of the digital data of each subblock area to be effected in one direction;
a replacing section for replacing only a pair of digital data diagonally opposite to each other in a respectively subblock area and representative of the color signal; and
a selecting section for selecting only processing of said rotation control section alone or a combination of processing of said rotation control section and processing of said replacing section.

10. The apparatus in accordance with claim 4, wherein said rotation and replacement control section comprises a rotation control section for controlling rotation of the digital data of each subblock area to be effected in one direction to produce rotated data including two series of chrominance pattern data which are different from each other and inverted in sign every two dots;
said apparatus further comprising:
an encoding section for executing encoding corresponding to an operation of said decoding section; and
an analog converting section for converting signals output from said encoding section to analog signals;
said encoding section comprising:
a first encoding section for selecting in a line-sequential mode an alternative one of the two series of chrominance pattern data produced to feed said analog converting section with the selected one series of data; and
a second encoding section for selecting in a dot-sequential mode one of the two series of chrominance pattern data produced to feed said analog converting section with the selected one series of data.

11. The apparatus according to claim 4, wherein said rotation and replacement control section comprises:
a rotation control section for controlling rotation of the digital data of each subblock area to be effected in one direction;
a replacing section for replacing a pair of digital data diagonally opposite to each other in a respective subblock area and representative of the color signal; and
a selecting section for selecting processing of said rotation control section alone or a combination of processing of said rotation control section and processing of said replacing section.

12. The apparatus according to claim 4, wherein said rotation and replacement control section comprises a rotation control section for controlling rotation of the digital data of each subblock area to be effected in one direction to produce rotated data including two series of chrominance pattern data;
said apparatus further comprising:
an encoding section for executing encoding corresponding to an operation of said decoding section; and
an analog converting section for converting signals output from said encoding section to analog signals;
said encoding section comprising:
a first encoding section for selecting in a line-sequential mode alternative one of the two series of chrominance pattern data produced to feed said analog converting section with the selected one series of data; and
a second encoding section for selecting in a dot-sequential mode one of the two series of chrominance pattern data produced to feed said analog converting section with the selected one series of data.

13. A processing method for use in an image processing apparatus including the steps of separating an input color image signal into a luminance signal and a color signal, converting said luminance signal and said color signal to corresponding pixel-by-pixel digital data, decoding said digital data by time-division sampling, storing each pair of the luminance signal and the color signal corresponding to a particular pixel in a memory area of a memory, and rotating an image fed from a memory control section for controlling said memory, said processing method comprising the steps of:
(a) dividing, in the event of image rotation, the digital data decoded into a plurality of blocks of digital data;
(b) writing each of said plurality of blocks of digital data in one of a plurality of block areas defined in said memory area;
(c) shifting said plurality of blocks of digital data to positions coinciding with an angle of rotation of an image block by block;
(d) subdividing the digital data in a respective block area stored in the memory into a plurality of subblocks of digital data; and
(e) shifting each of said plurality of subblocks of digital data in a respective block and respectively representative of the luminance signal and the color signal to positions coinciding with the angle of rotation of the image such that a color image is correctly displayed, and rearranging said positions.

14. A method in accordance with claim 13, wherein said plurality of blocks each comprises a square block area having an even number of pixels at each side, and wherein each subblock has four pixels as a basic shift unit.

15. The method in accordance with claim 14, wherein said step (e) comprises at least one of:
   (e1) rotating adjoining digital data of a respective subblock in only one direction to thereby shift said digital data; and
   (e2) replacing only a pair of digital data diagonally opposite to each other in the respective subblock and representative of the color signal; and step (e) further comprising:
   (e3) selecting a dot-sequential operation in which said step (e1) is performed without performing said step (e2), or a line-sequential operation in which said steps (e1) and (e2) are performed.

16. A method in accordance with claim 13, wherein step (a) comprises:
   (i) determining, based on a first position and a last position of said memory area where the digital data are written, whether or not an image to be displayed by said first parallel shift will maintain continuity; and
   (j) dividing, based on a result of step (i), the digital data in such a manner as to maintain continuity in said memory area;
      step (c) comprising (k) reading the digital data belonging to a same block at a time.

17. A method in accordance with claim 13, wherein step (c) comprises (1) holding rotation information derived from an orientation of a rotated image of an image represented by the digital data stored in said memory before step (c), and controlling said memory on the basis of said rotation information.

18. A method in accordance with claim 13, wherein said memory control section executes, after image rotation, encoding corresponding to a decoding operation, converts encoded outputs to analog signals, and mixes said analog signals to thereby output a composite video signal.

19. A method in accordance with claim 18, wherein the encoding, conversion of the encoded outputs to the analog signals and mixing of the analog signals are executed when an image is to be displayed.

20. A method in accordance with claim 14, wherein step (e) comprises:
   (m) rotating adjoining digital data of a respective subblock and respectively representative of the luminance signal and the color signal in only one direction to thereby shift said digital data; and
   (n) shifting only a pair of digital data diagonally opposite to each other in the respective subblock and representative of the color signal in parallel;
      said method further comprising (o) selecting, before steps (m) and (n), only step (m) or a combination of steps (m) and (n).

21. A method in accordance with claim 18, wherein the encoding selectively executes, based on a result of step (o), first encoding for encoding outputs produced by a subblock shift included in step (e) or second encoding for encoding corresponding to rearrangement also included in step (e).

22. The method according to claim 13, wherein said memory control section, after image rotation, executes encoding, converts encoded outputs to analog signals, and mixes said analog signals to thereby output a composite video signal.

23. The method according to claim 14, wherein step (e) comprises at least one of:
   (e1) rotating adjoining digital data of a respective subblock and respectively representative of the luminance signal and the color signal in one direction to thereby shift said digital data; and
   (e2) shifting a pair of digital data diagonally opposite to each other in the respective subblock and representative of the color signal in parallel; and step (e) further comprising:
   (e3) selecting a dot-sequential operation in which said step (e1) is performed without performing said step (e2), or a line-sequential operation in which said steps (e1) and (e2) are performed.

24. An image processing apparatus including a Y/C separating section for separating an input color image signal into a luminance signal (Y) and a color signal (C), a digital converting section for sampling said luminance signal and said color signal input from said Y/C separating section to thereby convert said luminance signal and said color signal to corresponding pixel-by-pixel digital data, a decoding section for time-division sampling said digital data input from said digital converting section and respectively representative of said luminance signal and said color signal to thereby decode said digital data, a memory having a memory area defining a plurality of block areas for storing said digital data decoded and output from said decoding section, and a memory control section for controlling said memory to write and read out the digital data in and from said memory, said image processing apparatus comprising:
   a data dividing section for dividing the digital data into a plurality of blocks of digital data and causing the memory control section to write each of said plurality of blocks of digital data in one of the plurality of block areas defined in a memory area of the memory;
   a first parallel shift control section for controlling a first parallel shift for shifting said plurality of blocks of digital data to positions coinciding with an angle of rotation of an image; and
   a second parallel shift control section for subdividing each of said plurality of blocks of digital data into a plurality of subblocks of digital data, and controlling a second parallel shift for shifting the digital data of each of said plurality of subblocks to positions coinciding with the angle of rotation of the image such that a color image is correctly displayed.

25. The apparatus in accordance with claim 1, wherein said first shift control section is set after said second shift control section.

* * * * *